US012663754B2

(12) United States Patent
Zhang et al.

(10) Patent No.: US 12,663,754 B2
(45) Date of Patent: Jun. 23, 2026

(54) TRANSFLECTIVE DIGITAL HOLOGRAPHIC MICROSCOPE SYSTEM

(71) Applicant: SHENZHEN TECHNOLOGY UNIVERSITY, Shenzhen (CN)

(72) Inventors: Xuhui Zhang, Shenzhen (CN); Wenjing Shen, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 449 days.

(21) Appl. No.: 17/797,120

(22) PCT Filed: Jun. 9, 2021

(86) PCT No.: PCT/CN2021/099209
§ 371 (c)(1),
(2) Date: Jun. 4, 2024

(87) PCT Pub. No.: WO2022/241875
PCT Pub. Date: Nov. 24, 2022

(65) Prior Publication Data
US 2024/0337982 A1 Oct. 10, 2024

(30) Foreign Application Priority Data

May 21, 2021 (CN) ......................... 202110560573.X

(51) Int. Cl.
*G02B 21/00* (2006.01)
*G02B 21/36* (2006.01)
(Continued)

(52) U.S. Cl.
CPC ......... *G03H 1/0005* (2013.01); *G02B 21/361* (2013.01); *G03H 1/0443* (2013.01); *G03H 1/0866* (2013.01); *G03H 2001/005* (2013.01)

(58) Field of Classification Search
CPC .... G02B 21/0092; G02B 21/00; G02B 21/04; G02B 21/361; G03H 1/0005; G03H 1/0443; G03H 1/0866; G03H 2001/005
(Continued)

(56) References Cited

U.S. PATENT DOCUMENTS

| | | | | |
|---|---|---|---|---|
| 8,687,253 B2 * | 4/2014 | Yu | ........................ | G03H 1/0443 |
| | | | | 359/22 |
| 11,635,289 B2 * | 4/2023 | Sato | ..................... | G03H 1/0866 |
| | | | | 356/479 |

(Continued)

OTHER PUBLICATIONS

"Optimized setup for integral refractive index direct determination applying digital holographic microscopy by reflection and transmission", M. Frometa et al, Optics Communications 387(2017) 252-256 (Year: 2017).*

*Primary Examiner* — Audrey Y Chang
(74) *Attorney, Agent, or Firm* — Jose Cherson Weissbrot

(57) ABSTRACT

A transflective digital holographic microscope system belongs to the technical field of microscopes, includes a reflection-type digital holographic microscope light path and a transmission-type digital holographic microscope light path, wherein the reflection-type digital holographic microscope light path is as follows: a first light beam is changed in polarization direction through a first polarizer, and is divided into two light waves with vertical polarization states; wherein the transmission-type digital holographic microscope light path is as follows: a second light beam is changed in polarization direction through a second polarizer, and is divided into two light waves with vertical polarization states, so that the thickness information and surface contour information of the sample can be tested at the same time.

10 Claims, 2 Drawing Sheets

(51) Int. Cl.
  *G03H 1/00*    (2006.01)
  *G03H 1/04*    (2006.01)
  *G03H 1/08*    (2006.01)

(58) Field of Classification Search
  USPC ............................................. 356/457; 359/1
  See application file for complete search history.

(56)       References Cited

U.S. PATENT DOCUMENTS

| | | | |
|---|---|---|---|
| 11,921,045 B2 * | 3/2024 | Matoba | G03H 1/06 |
| 2008/0018966 A1 * | 1/2008 | Dubois | G02B 21/22 |
| | | | 359/9 |
| 2017/0277123 A1 * | 9/2017 | Yasuda | G03H 1/30 |
| 2019/0250392 A1 * | 8/2019 | Cuche | G01B 9/021 |
| 2021/0199417 A1 * | 7/2021 | Choi | G01B 9/02041 |

* cited by examiner

TRANSFLECTIVE DIGITAL HOLOGRAPHIC MICROSCOPE SYSTEM

TECHNICAL FIELD

The present application belongs to the technical field of microscopes, in particular to a transflective digital holographic microscope system.

BACKGROUND

Depending on whether the laser light passes through a sample or is reflected by a sample, there are two typical light path layouts: transmission-type and reflection-type. Digital holographic microscopes are divided into transmission-type digital holographic microscope and reflection-type digital holographic microscope, among which transmission-type digital holographic microscope is mainly configured to measure the thickness information of a sample, and the reflection-type digital holographic microscope is mainly configured to measure the surface contour information of a sample.

The existing digital holographic microscope is generally a single transmission structure or a single reflection structure. When testing some special samples, such as micro-optical devices with radians, there will be a problem of inaccurate test results due to the fact that the test information of the samples which are measured by the transmission-type digital holographic microscope and the reflection-type digital holographic microscope cannot be obtained at the same time.

SUMMARY

Technical Problem

The present application aims to provide a transflective digital holographic microscope system for solving the problem that the existing digital holographic microscope cannot obtain transmission information and reflection information at the same time, which results in inaccurate test results.

Solutions to Problems

Technical Solutions

The above object of the present application is realized as follows: a transflective digital holographic microscope system is provided, which includes a reflection-type digital holographic microscope light path and a transmission-type digital holographic microscope light path; wherein the reflection-type digital holographic microscope light path is as follows: a first light beam is changed in polarization direction after passing through a first polarizer, and is divided into two light waves with vertical polarization states after passing through a polarizing light beam-splitting cube, wherein the light transmitted through the polarizing light beam-splitting cube is a first object light beam for forming a first object light path, and the light reflected by the polarizing light beam-splitting cube is a first reference light beam for forming a first reference light path.

The transmission-type digital holographic microscope light path is as follows: a second light beam is changed in polarization direction through a second polarizer, and is divided into two light waves with vertical polarization states after passing through the polarizing light beam-splitting cube, wherein the light reflected by the polarizing light beam-splitting cube is a second object light beam for forming a second object light path, and the light transmitted through the polarizing light beam-splitting cube is a second reference light beam for forming a second reference light path.

The first reference light beam is reflected by a dichroic mirror, and the second reference light beam is transmitted by the dichroic mirror.

Further, the first object light path is as follows: the first object light beam is reflected by a first mirror, transmitted by a first lens, transmitted by a first non-polarizing light beam-splitting cube and passes through a first object lens, and then irradiates a surface of a sample; the reflected light of the sample is reflected by the first non-polarizing light beam-splitting cube after passing through the first object lens, then collimated by a third lens and filtered by a first filter, and is incident on and received by a first camera.

The first reference light path is as follows: the first reference light beam is reflected by the dichroic mirror after adjustment of the polarization direction to a horizontal polarization state by a half-wave plate, then focused by a second lens, transmitted by the first non-polarizing light beam-splitting cube and collimated by the third lens, filtered by the first filter, and then is incident on the first camera, and interferes with the first object light beam; interference information is received by the first camera and processed and calculated by a computer for forming three-dimensional information of a surface reflection of the sample.

The second object light path is as follows: the second object light beam is reflected by the first mirror, transmitted by the first lens, transmitted by the first non-polarizing light beam-splitting cube and passes through the first object lens in sequence, then irradiates the surface of the sample, and passes through the sample and received by the second object lens, then reflected by a second non-polarizing light beam-splitting cube and collimated by a fifth lens, filtered by a second filter, and is incident on and received by a second camera.

The second reference light path is as follows: the second reference light beam is transmitted by the dichroic mirror after adjustment of the polarization direction to a vertical polarization state by the half-wave plate, then reflected by a second mirror, focused by a fourth lens, transmitted by the second non-polarizing light beam-splitting cube and collimated by the fifth lens, and then filtered by the second filter, and is incident on the second camera, and interferes with the second object light beam; interference information is received by the second camera and processed and calculated by the computer for forming three-dimensional information of a thickness of the sample.

Further, the first light beam and the second light beam are generated by applying a laser and a light beam expander, and the light beam expander includes a sixth lens, a seventh lens and a pinhole.

Further, the first light beam and the second light beam are generated by applying a fiber-coupled laser and a collimating lens.

Further, the sample includes a semiconductor, a micro-optical device, a biological sample or a mini/micro LED.

Compared with the related art, the transflective digital holographic microscope system provided by the present application has the following beneficial effects: a Michelson interferometer structure is configured to form a digital holographic microscope structure combining transmission and reflection of dual wavelengths, and a dichroic mirror is configured to divide the dual wavelengths into transmission and reflection paths, so that the thickness information and surface contour information of the sample can be tested at the same time, and the range of the tested sample is wider; and the transmission information and reflection information of the sample are obtained simultaneously for modeling; so that the obtained three-dimensional structure information of the sample is more complete and accurate. In addition, it can also be applied for real-time measurement of three-dimensional morphology and thickness information of samples.

Beneficial Effects of the Invention

BRIEF DESCRIPTION OF THE DRAWINGS

Illustration

In order to more clearly explain the technical solution in the embodiment of the present application, the drawings required in the description of the embodiment will be briefly introduced below. Obviously, the drawings in the following description are only one embodiment of the present application. For those of ordinary skilled in the art, other drawings can be obtained according to these drawings on the premise of no creative effort.

In which: 1a—first light beam. 1b—second light beam. 2—first polarizer, 3—polarizing light beam-splitting cube, 4—first mirror, 5—first lens, 6—first non-polarizing light beam-splitting cube, 7—first object lens, 8—sample, 9—half-wave plate, 10—dichroic mirror, 11—second lens, 12—third lens, 13—first camera, 14—second polarizer, 15—second mirror, 16—fourth lens, 17—second object lens, 18—second non-polarizing light beam-splitting cube, 19—fifth lens, 20—second camera, 21—computer, 22—first filter, 23—second filter, 111—laser, 112—sixth lens, 113—seventh lens, 114—pinhole, 221—fiber-coupled laser, 222—collimating lens.

DESCRIPTION OF THE EMBODIMENTS

Embodiments of the Invention

In order to make the technical problem to be solved, technical solution and beneficial effects by the present application clearer, the present application will be further explained in detail with reference to the drawings and embodiment. It should be understood that the specific embodiment described here are only for explaining the present application, but not for limiting the present application.

According to the present application, a Michelson interferometer structure is configured to form a digital holographic microscope structure based on the combination of transmission and reflection of dual wavelengths, and the purpose of dividing the light paths of two light beams of light with different wavelengths into a transmission light path and a reflection light path is achieved through a dichroic mirror. The dichroic mirror is configured to reflect light of a certain wavelength while transmitting light of other different wavelengths. For example, the optical indexes of common dichroic mirrors are transmitting red while reflecting green and blue, transmitting blue while reflecting red and green, transmitting red and green and reflecting blue, transmitting blue and green while reflecting red or reflecting red while transmitting blue and green.

Figure 1:
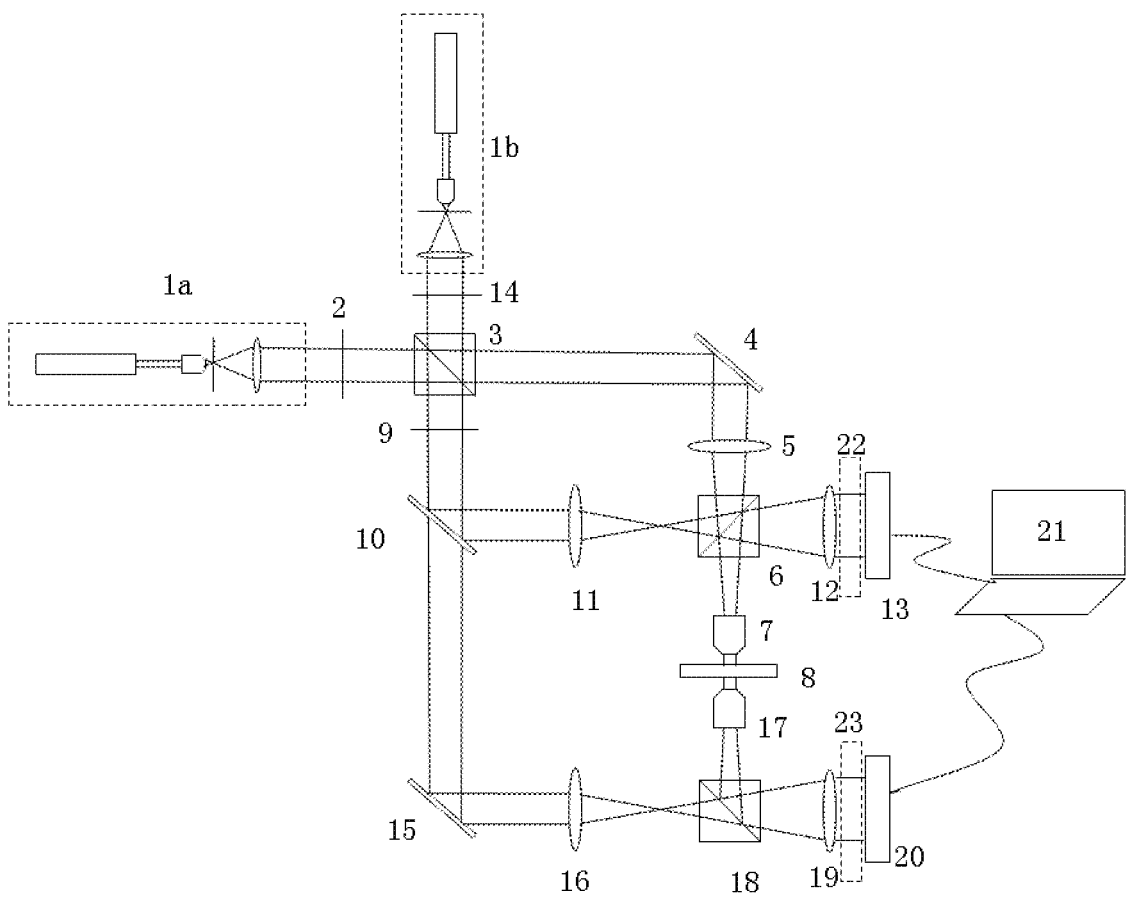
FIG. 1 is a schematic structural diagram of a transflective digital holographic microscope system provided by an embodiment of the present application.

Referring to FIG. 1, an embodiment of the present application provides a transflective digital holographic microscope system, which includes a reflection-type digital holographic microscope light path and a transmission-type digital holographic microscope light path.

The reflection-type digital holographic microscope light path is configured to obtain information of the surface reflection of a sample. As shown in FIG. 1, the reflection-type digital holographic microscope light path is as follows: a first light beam 1a is changed in polarization direction through a first polarizer 2, and is divided into two light waves with vertical polarization states after passing through a polarizing light beam-splitting cube 3, wherein the light transmitted through the polarizing light beam-splitting cube 3 (a first object light beam) is horizontally polarized for forming an object light path reflected by the sample (a first object light path), and the light reflected by the polarizing light beam-splitting cube 3 (a first reference light beam) is vertically polarized for forming a reference light path reflected by the sample (a first reference light path). The light path of the object light reflected by the sample is as follows: a first object light beam is reflected by a first mirror 4, transmitted by a first lens 5, transmitted by a first non-polarizing light beam-splitting cube 6 and passes through a first object lens 7, and then irradiates the surface of the sample 8. The reflected light of the sample 8 is reflected by the first non-polarizing light beam-splitting cube 6 after passing through the first object lens 7, then collimated by a third lens 12, filtered by a first filter 22, and is incident on and received by the first camera 13. The first reference light path is as follows: the polarization direction of the first reference light beam is adjusted to the horizontal polarization state by the half-wave plate 9, then the first reference light beam is reflected by a dichroic mirror 10, then focused by a second lens 11, transmitted by the first non-polarizing light beam-splitting cube 6 and collimated by a third lens 12, then filtered by the first filter 22, and then is incident on the first camera 13, and interferes with the first object light beam. The interference information is received by the first camera 13 and processed and calculated by the computer 21 for forming three-dimensional information of a surface reflection of the sample. The light received by the first camera 13 only contains the information of the first light beam 1a after being filtered by the first filter 22.

The transmission-type digital holographic microscope light path is applied for obtaining the transmission information of the sample. As shown in FIG. 1, the transmission-type digital holographic microscope light path is as follows: a second light beam 1b is changed in polarization direction by a second polarizer 14, and then divided into two light waves with vertical polarization state after passing through the polarizing light beam-splitting cube 3, wherein the light reflected by the polarizing light beam-splitting cube 3 (the second object light beam) is in a vertical polarization state, forming the object light path transmitted by the sample (a second object light path), and the light transmitted by the polarizing light beam-splitting cube 3 (a second reference light beam) is in a horizontal polarization state, forming a reference light path transmitted by the sample (a second reference light path). The second object light path is as follows: a second object light beam is reflected by a first mirror 4, transmitted by a first lens 5, transmitted by the first non-polarizing light beam-splitting cube 6 and passes through the first object lens 7 in sequence, then irradiates the surface of the sample 8, passes through the sample 8, received by a second object lens 17, then reflected by a second non-polarizing light beam-splitting cube 18 and collimated by a fifth lens 19, filtered by a second filter 23, and then incident on and received by a second camera 20. The second reference light path is as follows: the polarization direction of the second reference light beam is adjusted to the vertical polarization state by a half-wave plate 9, then the second reference light beam is transmitted by a dichroic mirror 10, then reflected by a second mirror 15, focused by a fourth lens 16, transmitted by the second non-polarizing light beam-splitting cube 18 and collimated by the fifth lens 19, then filtered by the second filter 23, and then incident on the second camera 20, and interferes with the second object light beam, and the interference information is received by the second camera 20 and processed and calculated by the computer 21 for forming three-dimensional information of a thickness of the sample. The light received by the second camera 20 only contains the information of the second light beam 1b after being filtered by the second filter 23.

As a light source, the first light beam 1a and the second light beam 1b are two collimated and expanded laser light beams with different wavelengths, and the two laser light beams are filtered by the dichroic mirror 10, the first filter 22 and the second filter 23 in the light path for achieving the purpose of a single laser light path. For example, when the first light beam 1a is green laser and the second light beam 1b is red laser, the dichroic mirror 10 is set to a lens that transmits red light and reflects green light, the first filter 22 is a filter that can only transmit green light, and the second filter 23 is a filter that can only transmit red light, so that the light received by the first camera 13 only contains the information of the green laser light path, that is, the reflection information of the sample, and the light received by the second camera 20 only contains the information of the red laser light path, that is, the transmission information of the sample.

Figure 2:
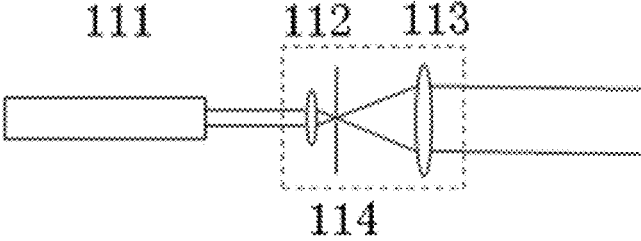
FIG. 2 is a schematic diagram of a structure of a light source provided by an embodiment of the present application.
Figure 3:
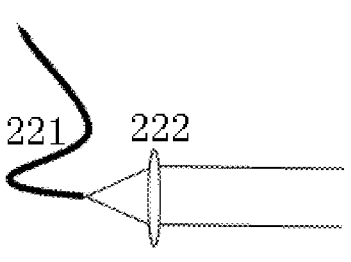
FIG. 3 is a schematic diagram of another structure of a light source provided by an embodiment of the present application.

FIG. 2 and FIG. 3 are schematic diagrams of two different structures of the light source provided by an embodiment of the present application. The first light beam 1a is taken as an example, and the structure of the second light beam 1b is the same as that of the first light beam 1a.

Referring to FIG. 2, the first light beam 1a can be generated by applying a laser 111 and a light beam expander, wherein the light beam expander includes a sixth lens 112, a seventh lens 113 and a pinhole 114. The laser light 111 enters the pinhole 114, passes through the lenses 112 and 113, and then is emitted.

Referring to FIG. 3, the first light beam 1a can also be directly generated by applying a fiber-coupled laser 221 and a collimating lens 222, and a incident light passes through the fiber-coupled laser 221 and the collimating lens 222, and then is emitted.

For these two light source structures, in order for achieving different light beam expanding spot sizes, different specifications of light beam expanding mirrors or collimating lenses can be selected.

Compared with the existing single-wavelength digital holographic microscope, the transflective digital holographic microscope system provided by the embodiment of the present application can simultaneously measure the thickness information and the surface contour information of the sample, so that the range of the tested sample is wider; and the transmission information and the reflection information of the sample are simultaneously obtained for modeling, so that the obtained three-dimensional structure information of the sample is more complete and accurate. In addition, it can also be applied for real-time measurement of three-dimensional morphology and thickness information of samples.

The embodiment of the present application provides a transflective digital holographic microscope system, and its application fields include semiconductor detection, micro-optical device detection, biological sample detection and mini/micro LED detection.

The above is only a preferred embodiment of the present application, and it is not intended to limit the present application. Any modifications, equivalent substitutions and improvements made within the spirit and principle of the present application should be included in the scope of protection of the present application.

What is claimed is:

1. A transflective digital holographic microscope system comprising a reflection-type digital holographic microscope light path and a transmission-type digital holographic microscope light path;

wherein the reflection-type digital holographic microscope light path is as follows: a first light beam is changed in polarization direction after passing through a first polarizer, and is divided into two light waves with vertical polarization states after passing through a polarizing light beam-splitting cube;

wherein the light transmitted through the polarizing light beam-splitting cube is a first object light beam for forming a first object light path, and the light reflected by the polarizing light beam-splitting cube is a first reference light beam for forming a first reference light path;

wherein the transmission-type digital holographic microscope light path is as follows: a second light beam is changed in polarization direction through a second polarizer, and is divided into two light waves with vertical polarization states after passing through the polarizing light beam-splitting cube;

wherein the light reflected by the polarizing light beam-splitting cube is a second object light beam for forming a second object light path, and the light transmitted through the polarizing light beam-splitting cube is a second reference light beam for forming a second reference light path;

wherein the first reference light beam is reflected by a dichroic mirror, and the second reference light beam is transmitted by the dichroic mirror.

2. The transflective digital holographic microscope system of claim 1, wherein the first object light path is as follows: the first object light beam is reflected by a first mirror, transmitted by a first lens, transmitted by a first non-polarizing light beam-splitting cube and passes through a first object lens, and then irradiates a surface of a sample; the reflected light of the sample is reflected by the first non-polarizing light beam-splitting cube after passing through the first object lens, then collimated by a third lens and filtered by a first filter, and is incident on and received by a first camera.

3. The transflective digital holographic microscope system of claim 2, wherein the first object light beam is filtered by the first filter before being incident on the first camera, the first filter is configured to filter light beams with different wavelengths and only transmits the first light beam.

4. The transflective digital holographic microscope system of claim 3, wherein the first reference light path is as follows: the first reference light beam is reflected by the dichroic mirror after adjustment of the polarization direction to a horizontal polarization state by a half-wave plate, then focused by a second lens, transmitted by the first non-polarizing light beam-splitting cube and collimated by the third lens, filtered by the first filter, and then is incident on the first camera, and interferes with the first object light beam; interference information is received by the first camera and processed and calculated by a computer for forming three-dimensional information of a surface reflection of the sample.

5. The transflective digital holographic microscope system of claim 4, wherein the second object light path is as follows: the second object light beam is reflected by the first mirror, transmitted by the first lens, transmitted by the first non-polarizing light beam-splitting cube and passes through the first object lens in sequence, then irradiates the surface of the sample, and passes through the sample and received by a second object lens, then reflected by a second non-polarizing light beam-splitting cube and collimated by a fifth lens, filtered by a second filter, and is incident on and received by a second camera.

6. The transflective digital holographic microscope system of claim 5, wherein the second object light beam is filtered by the second filter before being incident on the second camera, the second filter is configured to filter light beams with different wavelengths and only transmits the second light beam.

7. The transflective digital holographic microscope system of claim 6, wherein the second reference light path is as follows: the second reference light beam is transmitted by the dichroic mirror after adjustment of the polarization direction to a vertical polarization state by the half-wave plate, then reflected by a second mirror, focused by a fourth lens, transmitted by the second non-polarizing light beam-splitting cube and collimated by the fifth lens, and then filtered by the second filter, and is incident on the second camera, and interferes with the second object light beam; interference information is received by the second camera and processed and calculated by the computer for forming three-dimensional information of a thickness of the sample.

8. The transflective digital holographic microscope system of claim 1, wherein the first light beam and the second light beam are generated by applying a laser and a light beam expander, and the light beam expander comprises a sixth lens, a seventh lens and a pinhole.

9. The transflective digital holographic microscope system of claim 1, wherein the first light beam and the second light beam are generated by applying a fiber-coupled laser and a collimating lens.

10. The transflective digital holographic microscope system of claim 1, wherein the sample comprises a semiconductor, a micro-optical device, a biological sample or a mini/micro LED.

* * * * *